(12) United States Patent
Zitz

(10) Patent No.: US 6,428,066 B1
(45) Date of Patent: Aug. 6, 2002

(54) MATERIAL HANDLING DEVICE

(76) Inventor: Rudolph A. Zitz, 177 Attlebury Rd., Stanfordville, NY (US) 12581

( * ) Notice: Subject to any disclaimer, the term of this patent is extended or adjusted under 35 U.S.C. 154(b) by 0 days.

(21) Appl. No.: 09/705,194

(22) Filed: Nov. 3, 2000

(51) Int. Cl.⁷ .............................. B65G 7/12; B25J 1/00
(52) U.S. Cl. ............................ 294/17; 294/14; 294/26; 294/61
(58) Field of Search .................... 294/1.1, 15, 26, 294/19.1, 19.3, 14, 61, 17; 43/6

(56) References Cited

U.S. PATENT DOCUMENTS

| | | | | |
|---|---|---|---|---|
| 205,523 A | * | 7/1878 | Broad | 294/17 |
| 1,573,539 A | * | 2/1926 | Brown | 294/19.1 |
| 2,031,044 A | * | 2/1936 | Jensen et al. | 294/61 |
| 2,367,105 A | * | 1/1945 | Donaldson | 294/61 |
| 2,391,185 A | * | 12/1945 | Niemi | 294/61 |
| 2,864,643 A | * | 12/1958 | Juntunen | 294/61 |
| 2,883,229 A | * | 4/1959 | Juntunen | 294/17 |
| 2,974,993 A | * | 3/1961 | Duniven | 294/61 |
| 3,004,362 A | * | 10/1961 | Day | 43/6 |
| 3,380,092 A | * | 4/1968 | Golczynski | 294/61 |
| 3,766,678 A | * | 10/1973 | Reave | 294/61 |
| 4,043,067 A | * | 8/1977 | Konucik et al. | 294/61 |
| 4,183,570 A | * | 1/1980 | Broyles et al. | 294/61 |
| 4,209,929 A | * | 7/1980 | Mishima | 294/61 |
| 4,502,722 A | * | 3/1985 | Rocquin | 294/61 |
| 4,560,194 A | * | 12/1985 | Rybeck | 294/61 |
| 5,487,576 A | * | 1/1996 | Du Vivier | 294/19.1 |
| 5,934,852 A | * | 8/1999 | Stingl | 411/372.5 |

* cited by examiner

*Primary Examiner*—Eileen D. Lillis
*Assistant Examiner*—Paul T. Chin

(57) ABSTRACT

A material handling device, primarily intended for moving material such as firewood, having an elongated handle with a shaft mounted on the handle and with a point removable mounted in the shaft, the handle, the shaft and the point all being concentrically aligned with one another, the point including a lip to retain the point in the material which can be released by tossing the material or moving the handle over the lip.

12 Claims, 3 Drawing Sheets

MATERIAL HANDLING DEVICE

BACKGROUND OF THE INVENTION

1. Field of the Invention

This device relates to a material handling device and more specifically to a device for handing fire wood.

2. Prior Art and Objects of the Invention

It is well known that many materials are difficult to handle and most especially firewood is difficult to handle and to move. Just one situation is loading firewood onto a carrier or into a cart to bring it into the home for use from an outside pile. This is notably so when the wood is wet or covered with snow. Clothing is quickly soiled and even with gloves the hands become wet and cold. It is definitely desirable to be able to handle material such as firewood without having to touch to firewood and while being able quickly and assuredly to lift, toss and move the firewood. The instant invention is specifically designed to handle firewood but may be also used for other materials providing the consistency of the other materials is sufficiently similar to wood to permit penetration by the Device.

Devices are known for handling wood, most specifically pulp logs with a device commonly referred to as a pickaroon. One version of the pickaroon, described as being suitable for use with firewood, is described in the Rybeck Patent, U. S. Pat. No. 4,560,194. The Rybeck Patent and pickaroons in general specifically teach a device with a point generally located at right angles to the handle. Such devices have the same general relationship between the point and the handle as an axe or a maul.

Another example of a pickaroon is shown in the Juntunen Patent, U.S. Pat. No. 2,883,229 which teaches a pickaroon with a removable point.

Devices for handling a variety of materials are also shown in the Leu patent, U.S. Pat. No. 4,889,375 and the Rocquin Patent, U.S. Pat. No. 4,502,722.

The Leu Patent teaches a device for use in handling firewood but when the firewood is in a fireplace. Liu, in essence, teaches an improved fireplace poker. The device proposed by Liu, however, is an elongated member with a handle at one end.

The Rocquin Patent is also an elongated member with a handleat one end but with a straight spear for picking up trash by penetrating the trash. The Rocquin Patent further teaches an apparatus totally unrelated to the instant invention for removing the trash from the tip. The tip, as described in the Rocquin Patent, is removable and thus replaceable.

The Konucik, et. al. Patent, U.S. Pat. No. 4,043,067 teaches an elongated device for spearing frogs. Konucik, et. al. shows a set screw with a spring about it for retaining the spear in different positions in the handle.

These devices do not provide an easy way to pick up and toss or otherwise move firewood while standing upright and back away from the wood.

Accordingly, it is an object of the present invention to provide a device for easily handling materials, such a firewood, when in a standing position away from the material so as to be able to lift, move and toss the material without bending down and picking up the material with the hands.

Accordingly, it is another object of the present invention to provide a device which can be easily thrust into a unit of material, such as a piece of firewood, so as securely to hold the material for moving of the material while also permitting easy release from the material.

It is another object of the present invention to provide a device where the point which engages the material can be readily replaced if damaged or worn.

It is still another object of the present invention to provide a device which is both economical and durable.

It is still another object of the present invention to provide a device which is simple and easy to use.

Other objects and advantages of the present invention will be come apparent to those of ordinary skill in the art as the description thereof proceeds.

SUMMARY OF THE INVENTION

A material handling device is achieved by mounting a point on a handle with the point and the handle being aligned with one another. The point is provided with a shank end and a working end, the working end of the point has a top surface and a bottom surface and two side surfaces and an end surface at the working end. The side surfaces are slightly sloped toward the working end. The top and bottom surfaces slope toward the working end. The end surface extends above the top surface and a lip surface extends from the top surface to the end surface to form a lip with an edge. Means are provided for connecting the point to the handle. The handle and the point are axially aligned with one another.

DETAILED DESCRIPTION OF THE DRAWINGS

DETAILED DESCRIPTION OF THE PREFERRED EMBODIMENT

Figure 1:
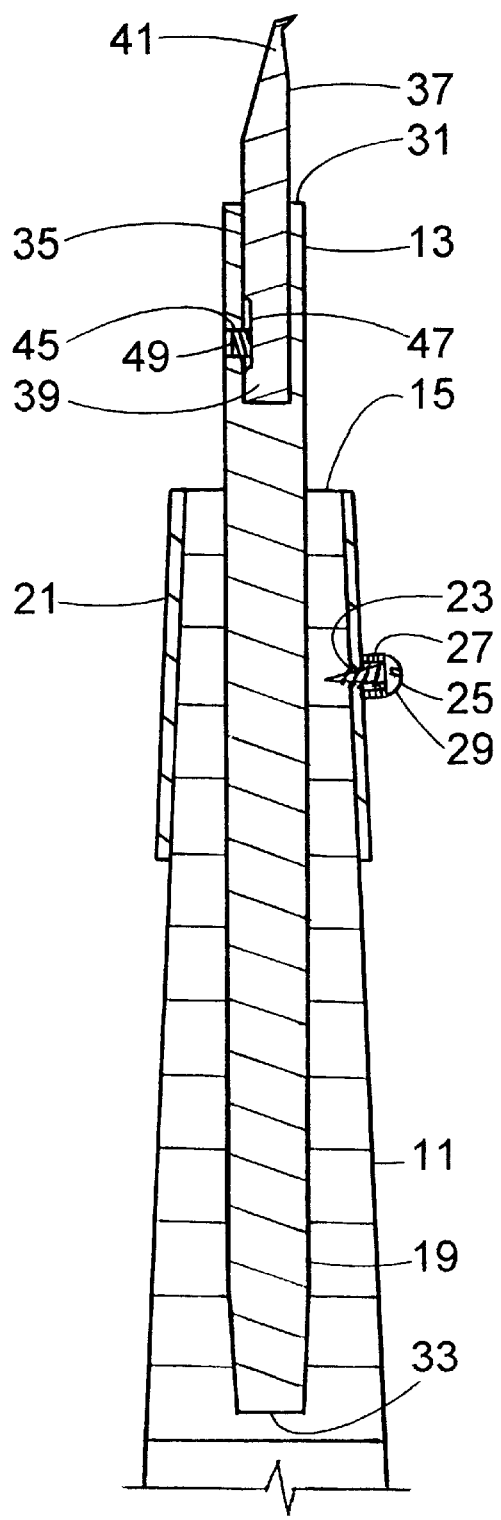
FIG. 1 is a cross sectional side view along the longitudinal axis of the device showing the point mounted in the shaft which in turn is press fitted into the handle.
Figure 2:
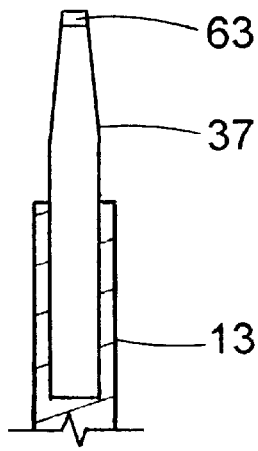
FIG. 2 is a partial cross sectional top view showing the point in the shaft.
Figure 3:
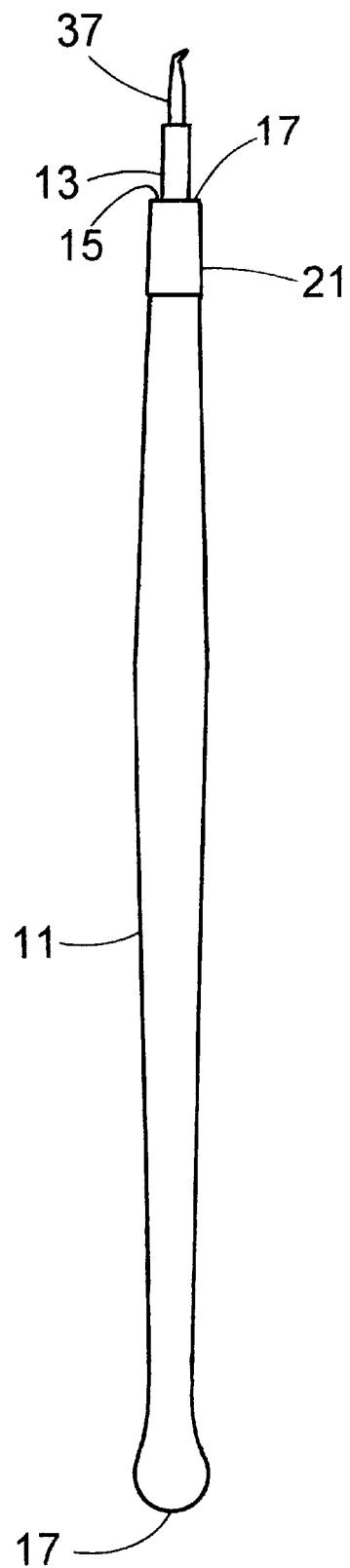
FIG. 3 is a side view of the entire Material Handling Device.

Referring now to FIG. 1, a handle 11 is shown with a shaft 13 that is press fitted into the handle 11. The handle 11, best shown in its entirety in FIG. 3, is an elongated member with an inner end 15 and an outer end 17. Returning to FIG. 1, a handle opening 19 is formed concentrically into the inner end 15 of the handle 11 for a portion of the length of the handle 11. The shaft 13 is press fitted into the handle opening 19.

A boot 21 is placed about the inner end 15 of the handle 11 and extends from the inner end 15 of the handle 11 for only a portion of the length of the handle opening 19. The boot 21 provides resistance against the handle 11 splitting from the shaft 13 being press fitted into the handle opening 19 of the handle 11 which most appropriately would be made of wood. A hole 23 is formed in the boot 21, generally midway along the length of the boot 21. A retaining screw 25 is screwed into the hole 23 and into the handle 11 but the retaining screw 25 is of a sufficient length so that a collar 27 can be placed about the retaining screw 25. The collar 27 is held against the boot 21 by the head 29 of the screw 25 and the combination of the collar 27 and the head 29 of the retaining screw 25 creates a readily visible marker on the boot 21. The head 29 of the retaining screw 25 and the collar 27 are preferably coated with a highly visible coating to make the retaining screw 25 and the collar 27 very detectable as a marker. The retaining screw 25 and the collar 27 serve to align the Material Handling Device when being used, as is further explained hereinafter.

The shaft 13 has a lower end 31 and an upper end 33, the upper end 33 being mounted within the handle opening 19 and the lower end 31 extending from the handle 11. As best seen in FIG. 1, the major portion of the shaft 13 is embedded in the handle opening 19 within the handle 11 with only a minor portion of the shaft 13 extending from the inner end 15 of the handle 11. A shaft opening 35 extends generally concentrically into the lower end 31 along a small portion of the length of the shaft 13. The shaft opening 35 is located within the portion of the shaft 13 which extends outside the handle 11.

A point 37 fits into the shaft opening 35. The point 37 has a shank end 39 which is round so as to fit snugly into the shaft opening 35 and has a working end 41 which is thrust into a unit of material, most usually a piece of firewood.

A tapped opening 45 is formed in the shaft 13 and extends into the shaft opening 35, generally at right angles to the shank end 39 of the point 37. The point 37 has a flat 47 cut into it adjacent the tapped opening 45. A set screw 49 is threaded into the tapped opening 45 and engages the flat 47 in the point 37 thereby locking the point 37 in place within the shaft 13. The point 37 may, however, be readily replaced merely by turning back the set screw 49, withdrawing the point 37, inserting another point 37 and tightening the set screw 49.

It should be noted, as shown in FIG. 1 and FIG. 3, that the handle 11, the shaft 13 and the point 37 are all generally concentrically aligned with one another. As best seen in FIG. 3, the major portion of the length of the Material Handling Device is in the handle 11.

Figure 4:
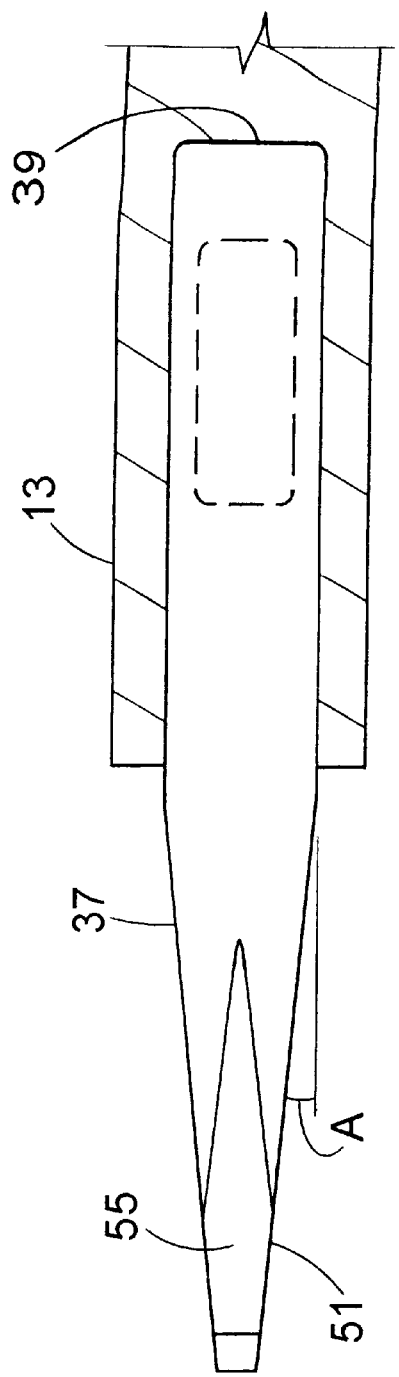
FIG. 4 is a top view of the point and a portion of the shaft adjacent to the point.
Figure 5:
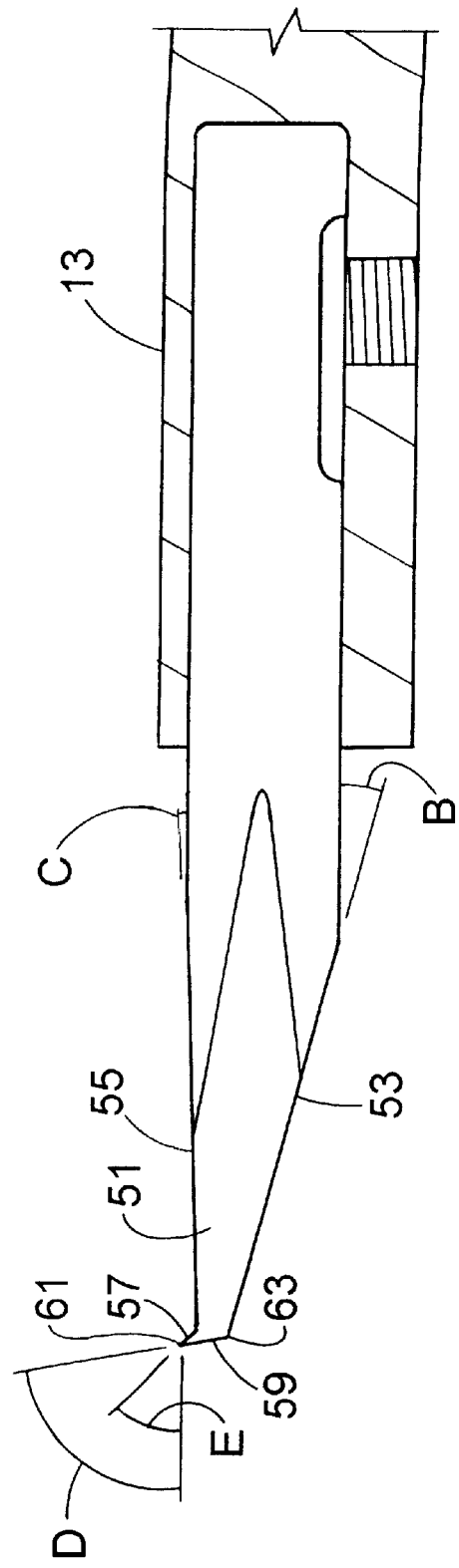
FIG. 5 is a side view of the point and the portion of the shaft adjacent to the point.

The configuration of the working end 41 of the point 37 is vital to the successful operation of the device. The angular relationships of the working end of the point 37 are shown in FIG. 4 and in FIG. 5. The point 37 is slightly tapered on its sides surfaces 51 as the side surfaces 51 are progressively slightly closer to one another as the point 37 extends from the shank end 39 to the working end 41. The bottom surface 53 slopes progressively closer to the top surface 55 of the point 37, as the bottom surface 53 extends from the shank end 39 to the working end 41. The top surface 55 slopes toward the bottom surface 53 progressively as the point 37 extends toward the working end 41 but the slope of the top surface 55 begins approximately halfway between the shank end 39 and the working end 41.

A lip surface 57 extends sharply at an obtuse angle to the top surface 55 toward the working end 41. The end surface 59 slopes from the bottom surface 53 at an obtuse angle to the bottom surface 53 and is directed away from the top surface 55 and beyond the top surface 55, meeting the lip surface 57 at an edge 61, which preferably is a sharp edge, thereby forming a lip 63 which extends from the top surface 55 at the working end 41.

As a point of reference, quantitative angles are stated hereinafter from a line parallel to the major axis of the handle, shaft and point, which is the major axis of the entire device. The qualitative angles previously referred to are the angles, generally speaking, between specified surfaces.

The point 37, as viewed looking down on the top surface 55, as shown in FIG. 4, is symmetrical. The angle A of slope of the side surfaces 51 of the point 37 is preferably approximately six degrees with a possible range of four to eight degrees. The angle B of slope of the bottom surface 53 is approximately fifteen degrees with a range of ten degrees to twenty degrees. The angle C of the slope of the top surface 55 is very slight, and is also approximately six degrees with a range of three degrees to ten degrees.

The end surface 59 extends from the bottom surface 53 to the edge 61 above the top surface 55 at an angle of slope D of approximately seventy-five degrees with a range of sixty-five degrees to eighty five degrees. The lip surface 51 slopes from the edge 61 to the top surface 55 at an angle E of approximately forty five degrees and within a range of forty degrees to fifty degrees. The end surface 59 and the lip surface 57 form the lip 63 with the edge 61 which should be sharp so as readily to penetrate the material to hold the material onto the point 37.

The retaining screw 25, previously described as being brightly colored is aligned with the edge 61 so that by having the retaining screw 25 directed upwardly when used, the edge 61 is also directed upwardly and is therefore in the proper position for use.

The design of the point 37 permits the point 37 to penetrate material, such as a piece of wood, merely by jabbing the point 37 into the material by the handle 11 which is aligned with the point 37 and without the force obtainable by use of a handle generally at right angles to the point 37. Once into the material, the handle 11 is best rotated slightly backwardly to force the lip 63 upwardly into the material thereby assuring a grip on the material. If the material is tossed up into a cart, the upward movement of the material causes the material to release from the point 37 at the top of the throw. If the material is placed elsewhere, merely rotating the handle 11 slightly forward, which is the opposite direction used to embed the lip 63, the lip 63 will move out of the material and permit the point 37 to be readily withdrawn from the material. Due to the length of the handle 11, the Material Handling Device is used from a remote position and the material never needs to be touched to be lifted, tossed or moved.

Thus, while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A material handling device, comprising:
    a handle, said handle being an elongated member and having an outer end and an inner end;
    a point including a shank end and a working end, the working end of the point having a top surface and a bottom surface and two side surfaces and an end surface at the working end, both side surfaces being slightly sloped toward the working end and the top and bottom surfaces sloping toward each other and the working end, the end surface extending from the bottom surface at the working end at an obtuse angle to the bottom surface and beyond and above the top surface, a lip surface extending from the top surface to the end surface to form a lip with an edge; and
    means for connecting the point to the handle, the handle and the point being axially aligned with one another.

2. A material handling device according to claim 1 further including a means to indicate the position of the lip.

3. A material handling device according to claim 1 wherein the slope of the end surface in relation to the handle and the point is approximately eighty degrees.

4. A material handling device according to claim 1 wherein the slope of the lip surface in relation to the handle and the point is approximately forty five degrees.

5. A material handling device according to claim 1 wherein the slope of the end surface in relation to the handle and point is approximately eighty degrees and the slope of the lip surface in relation to the handle and point is approximately forty five degrees.

6. A material handling device, comprising:

a handle, said handle being an elongated member and having an outer end and an inner end with a handle opening concentrically located in the inner end, said handle opening extending from the inner end toward the outer end;

a shaft, said shaft being an elongated bar tightly fitted into the handle opening and having a lower end and an upper end, the upper end being within the handle opening and the lower end extending beyond the handle, a shaft opening concentrically located in the lower end of the shaft and extending toward the upper end of the shaft; and a point including a shank end and a working end, the shank end being mounted in the shaft opening, the shaft including means to retain the point in the shaft opening, the working end of the point having a top surface and a bottom surface and two side surfaces and an end surface at the working end, both side surfaces being slightly sloped toward the working end and the top and bottom surfaces sloping toward each other and the working end, the end surface extending from the bottom surface at the working end and at an obtuse angle to the top surface and beyond and above the top surface at an obtuse angle to the top surface, a lip surface extending from the top surface to the end surface forming a lip with an edge.

7. A material handling device according to claim 6 wherein the slope of the side surfaces is approximately six degrees.

8. A material handling device according to claim 6 further including a boot located about the handle at the inner end to retain the handle around the shaft.

9. A material handling device according to claim 6 further including means to indicate the position of the lip.

10. A material handling device according to claim 6 further including a boot located about the handle at the inner end to retain the handle around the shaft and a means mounted on the boot to indicate the position of the lip.

11. A material handling device, comprising:

a handle, said handle being an elongated member and having an outer end and an inner end with a handle opening concentrically located in the inner end, said handle opening extending from the inner end toward the outer end;

a shaft, said shaft being an elongated bar tightly fitted into the handle opening and having a lower end and an upper end, the upper end being within the handle opening and the lower end extending beyond the handle, a shaft opening concentrically located in the lower end of the shaft and extending toward the upper end of the shaft;

a boot located about the handle at the inner end to retain the handle around the shaft, said boot having a hole extending through it into the handle;

a retaining screw and collar, the collar being mounted on the retaining screw, the retaining screw being secured into the hole in the boot and into the handle; and a point including a shank end and a working end, the shank end being mounted in the shaft opening, said shaft having a tapped opening with a set screw, the shank end of the shaft having a flat, the set screw engaging the flat, the working end of the point having a top surface and a bottom surface and two side surfaces and an end surface at the working end, both side surfaces being slightly sloped toward the working end and the top and bottom surfaces sloping toward each other and the working end, the end surface extending from the bottom surface at the working end and at an obtuse angle to the top surface and beyond and above the top surface, a lip surface extending from the top surface to the end surface forming a lip with an edge, the retaining screw and the collar being aligned with the lip.

12. A material handling device according to claim 11 wherein the retaining screw and collar are brightly colored.

* * * * *